United States Patent Office 3,378,563
Patented Apr. 16, 1968

3,378,563
BIS-PHENYLALKYLPIPERIDIDES
Francis E. Cislak, Indianapolis, Ind., assignor to Reilly Tar & Chemical Corporation, Indianapolis, Ind., a corporation of Indiana
No Drawing. Filed Apr. 5, 1965, Ser. No. 445,734
6 Claims. (Cl. 260—294)

ABSTRACT OF THE DISCLOSURE

Bis-phenylalkylpiperidides are disclosed. They are prepared by the interaction of a phenylalkylpiperidine with a dicarboxylic acid, a dicarboxylic acid ester, or a dicarboxylic acid chloride. They are useful as plasticizers for polyvinylchlorides, etc.

This invention relates to a new composition of matter. More particularly, it relates to bis-phenylalkylpiperidides of dicarboxylic acids, which compounds have the general formula:

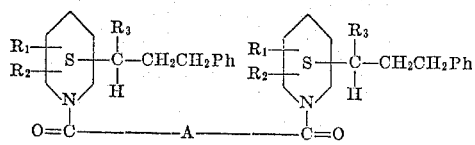

wherein $R_1$, $R_2$, and $R_3$ represent hydrogen or lower alkyl group and A represents an alkylene radical, an alkenylene radical (such, for example, as the maleic acid radical, the citraconic acid radical, the glutaconic acid radical, and the like) and an arylene radical (such, for example, as the phthalic acid radical, the isophthalic acid radical, the terephthalic acid radical, the naphthalic acid radical, the dinicotinic acid radical, the isocinchomeronic acid radical, and the like) and Ph represents a phenyl group.

In general, my bis-phenylalkylpiperidides may be prepared by the interaction of a phenylalkylpiperidine with a dicarboxylic acid, a dicarboxylic acid di-ester, or a dicarboxylic acid chloride.

My dicarboxylic acid bis-phenylalkylpiperidides are useful in the formulation of industrial paints. In the protection of steel tanks, bridge structures, pipe lines, etc., coal-tar pitch paints have been used for decades. In areas where sub-zero temperatures are encountered, it is necessary that the coal-tar pitch be flexible enough to avoid cracking the film at these sub-zero temperatures. Flexibility in coal-tar pitch is achieved by leaving more of the lower-boiling coal-tar oils in the pitch. While such pitch has the desired flexibility during the sub-zero exposure, it is not well adapted to the hot summer temperatures. The lower-boiling oils are volatilized by the sun during the summer with the result that a more brittle pitch must be able to go through the following winter. Because of their low volatility and their compatibility, my bis-phenylalkylpiperidides may be added to a coal-tar pitch free of lower-boiling oils and achieve a pitch that is flexible from winter to winter. I need use only 5 to 10% (based on the coal-tar pitch) of my dicarboxylic acid bis-phenylalkylpiperidides to obtain a coal-tar pitch suitable for the manufacture of coal-tar paints.

My dicarboxylic acid bis-phenylalkylpiperidides are useful as plasticizers. Because of their low volatility and compatibility, they are useful in plasticizing polyvinylchloride used in high temperature wire insulation applications. Usually from 25 to 50 parts of plasticizer are used for each 100 parts of polyvinylchloride homopolymer.

The phenylalkylpiperidines used in carrying out my invention are made by the catalytic hydrogenation of phenylalkylpyridines.

The manner in which the compounds of my invention may be prepared is illustrated by the following examples. It is to be understood that these examples are given by way of illustration only and are not intended as a limitation upon my invention.

Example 1.—Adipic acid-bis-4-phenylpropylpiperidide

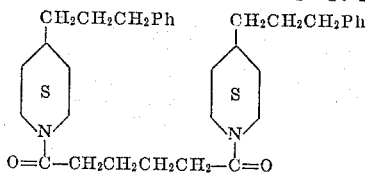

Into a flask equipped with a stirrer and a condenser there are placed 73 grams of adipic acid and 186 grams of 4-phenylpropylpiperidine. Then the mixture is slowly heated. A reaction occurs causing an evolution of water and the formation of adipic acid-bis-4-phenylpropylpiperidide. When the temperature reaches about 150° C., it is maintained there until no more water is evolved (this usually takes about four to five hours). The product, adipic acid-bis-4-phenylpropylpiperidide, is poured into a shallow pan and allowed to cool and solidify. It is soluble in aromatic hydrocarbons and is insoluble in water.

Example 2.—Sebacic acid-bis-4-phenylpropylpiperidide

The procedure of Example 1 is repeated with the exception that 101 grams of sebacic acid are used in place of the 73 grams of adipic acid.

Example 3.—Terephthalic acid-bis-4-phenylpropyl-piperidide

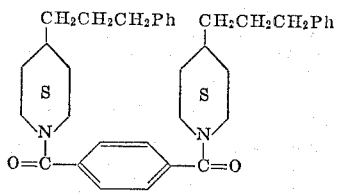

Into a flask equipped with a stirrer and a condenser are placed 97 grams of the di-methyl ester of terephthalic acid and 186 grams of 4-phenylpropylpiperidine. While stirring the mixture, it is heated slowly. A reaction occurs causing an evolution of methanol and the formation of the terephthalic acid-bis-4-phenylpropylpiperidide. Heating is continued in the range of 150–175° C. until about 32 cc. of methanol has been evolved. The product, terephthalic acid-bis-4-phenylpropylpiperidide is poured out of the flask while still hot.

Example 4.—Phthalic acid-bis-4-phenylpropylpiperidide

The procedure of Eample 1 is repeated with the exception that 74 grams of phthalic anhydride are used in place of the 73 grams of adipic acid.

Example 5.—Maleic acid-bis-4-phenylpropylpiperidide

The procedure of Example 3 is repeated with the exception that 72 grams of the di-methyl ester of maleic acid is used in place of the dimethyl-terephthalate.

Example 6.—Brassylic acid-bis-2-phenylpropylpiperidide

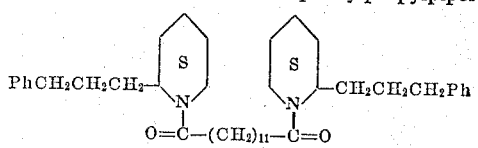

The procedure of Example 3 is repeated with the exception that 129 grams of the dimethyl ester of brassylic acid is used in place of the 97 grams of dimethyl-terephthalate and 186 grams of 2-phenylpropylpiperidine is used in place of the 4-phenylpropylpiperidine.

Example 7.—Adipic acid-bis-2-phenylpropyl-5-ethylpiperidide

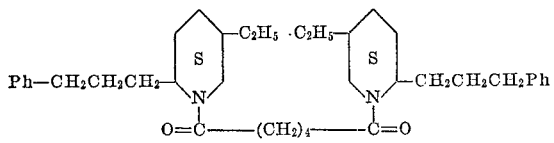

The procedure of Example 1 is repeated with the exception that 214 grams of 2-phenylpropyl-5-ethylpiperidine is used in place of the 186 grams of 4-phenylpropylpiperidine.

Example 8.—Decane-1,10-dicarboxy-bis-4-(1'-ethyl-3'-phenyl)propyl piperidide

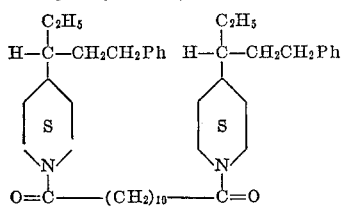

The procedure of Example 1 is repeated with the exception that I use 115 grams of dodecanedoic acid (decane-1,10-dicarboxylic acid) in place of the 73 grams of adipic acid, and I use 214 grams of 4-(1'-ethyl-3'-phenyl)propylpiperidine in place of the 186 grams of 4-phenylpropylpiperidine.

Example 9.—Di-nicotinic acid-bis-4-phenylpropyl-piperidide

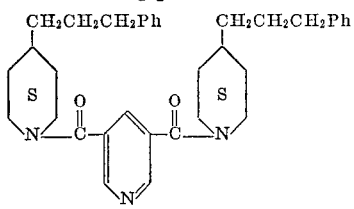

The procedure of Example 1 is used with the exception that 84 grams of di-nicotinic acid (pyridine-3,5-dicarboxylic acid) is used in place of the 73 grams of adipic acid.

Example 10.—Glutaconic acid-bis-3-phenylpropyl-piperidide

The procedure of Example 1 is repeated with the exception that 65 grams of glutaconic acid is used in place of the 73 grams of adipic acid and 3-phenylpropylpiperidine is used in place of the 4-phenylpropylpiperidine.

Example 11.—Naphthalene-2,6-dicarbox-bis-4-phenylpropylpiperidide

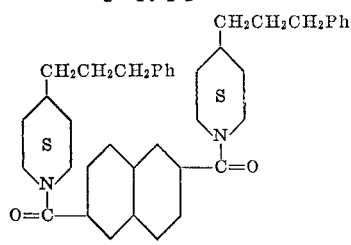

The procedure of Example 3 is repeated with the exception that 122 grams of the dimethyl ester of naphthalene-2,6-dicarboxylic acid is used in place of the 97 grams of the dimethyl ester of terephthalic acid.

Example 12.—Azelaic acid-bis-4-phenylpropylpiperidide

The procedure of Example 1 is repeated with the exception that 94 grams of azelaic acid are used in place of the 73 grams of adipic acid.

Example 13.—Adipic acid-bis-2-phenylpropylpiperidide

The procedure of Example 1 is repeated with the exception that 2-phenylpropylpiperidine is used in place of the 4-phenylpropylpiperidine.

Example 14.—Phthalic acid-bis-4-phenylpropylpiperidide

Into a flask equipped with a stirrer is placed a mixture of 186 grams of 4-phenylpropylpiperidine and 100 grams of sodium carbonate. The mixture is heated to about 70° C. and while stirring it, there is added slowly 102 grams of phthaloyl chloride. The heating and stirring are continued for about two hours after all of the phthaloyl chloride has been added. The phthalic acid-bis-4-phenylpropylpiperidide formed is then separated from the inorganic salts by extraction with benzene.

I claim as my invention:

1. Bis-phenylalkylpiperidides of the formula

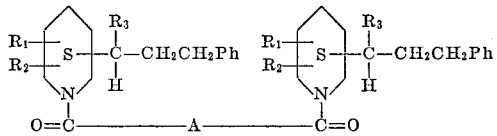

wherein $R_1$, $R_2$, and $R_3$ are selected from the group consisting of hydrogen and lower alkyl, A represents a member of the class consisting of alkylene radical, alkylene to form acid moieties selected from the group consisting of maleic acid, citraconic acid, and glutaconic acid radical, and arylene radical to form acid moieties selected from the group consisting of phthalic acid, isophthalic acid, terephthalic acid, naphthalic acid, dinicotinic acid, and isocinchomeronic acid, and pH represents a phenyl radical.

2. Adipic acid-bis-4-phenylpropylpiperidide.
3. Adipic acid-bis-2-phenylpropylpiperidide.
4. Azelaic acid-bis-4-phenylpropylpiperidide.
5. Maleic acid-bis-4-phenylpropylpiperidide.
6. Phthalic acid-bis-4-phenylpropylpiperidide.

References Cited

UNITED STATES PATENTS

| | | | |
|---|---|---|---|
| 2,166,118 | 7/1939 | Bousquet et al. | 260—294 |
| 3,210,359 | 10/1965 | Cislak et al. | 260—294 |
| 3,219,612 | 11/1965 | Skau et al. | 260—294 |
| 3,219,659 | 11/1965 | Skau et al. | 260—294 |
| 3,222,203 | 12/1965 | Skau et al. | 260—294 |

FOREIGN PATENTS 306,559   6/1955   Switzerland.

OTHER REFERENCES

Zinner et al., J. fur Prakt. Chemie, vol. 17(4), pp. 113 to 120, 1962.

JOHN D. RANDOLPH, Primary Examiner.

WALTER A. MODANCE, Examiner.

A. D. SPEVACK, Assistant Examiner.